(12) United States Patent  
Fujita

(10) Patent No.: US 11,614,528 B2
(45) Date of Patent: Mar. 28, 2023

(54) SETTING METHOD OF MONITORING SYSTEM AND MONITORING SYSTEM

(71) Applicant: KONICA MINOLTA, INC., Chiyoda-ku (JP)

(72) Inventor: Junichi Fujita, Chiyoda-ku (JP)

(73) Assignee: KONICA MINOLTA, INC., Tokyo (JP)

(*) Notice: Subject to any disclaimer, the term of this patent is extended or adjusted under 35 U.S.C. 154(b) by 396 days.

(21) Appl. No.: 16/300,220

(22) PCT Filed: May 9, 2017

(86) PCT No.: PCT/JP2017/017468
§ 371 (c)(1),
(2) Date: Nov. 9, 2018

(87) PCT Pub. No.: WO2017/199785
PCT Pub. Date: Nov. 23, 2017

(65) Prior Publication Data
US 2019/0154817 A1    May 23, 2019

(30) Foreign Application Priority Data

May 17, 2016   (JP) .............................. JP2016-098628

(51) Int. Cl.
*G01S 7/51* (2006.01)
*G08B 13/187* (2006.01)
(Continued)

(52) U.S. Cl.
CPC ................ *G01S 7/51* (2013.01); *G01S 17/06* (2013.01); *G06T 7/00* (2013.01); *G08B 13/187* (2013.01)

(58) Field of Classification Search
CPC ........ G01C 5/00; G01C 15/002; G01S 7/4817; G01S 17/86; G01S 17/89; G01S 17/42
See application file for complete search history.

(56) References Cited

U.S. PATENT DOCUMENTS

| | | | |
|---|---|---|---|
| 2005/0057745 A1* | 3/2005 | Bontje | G01C 15/002 356/139.03 |
| 2015/0085068 A1* | 3/2015 | Becker | G06T 7/521 348/39 |
| 2017/0227357 A1* | 8/2017 | Ohtomo | G01S 17/86 |

FOREIGN PATENT DOCUMENTS

| | | | |
|---|---|---|---|
| JP | 2001128052 A | * | 5/2001 |
| JP | 2007-122507 | | 5/2007 |

(Continued)

*Primary Examiner* — Luke D Ratcliffe
(74) *Attorney, Agent, or Firm* — Cozen O'Connor

(57) ABSTRACT

A setting method of a monitoring system including a light projecting and receiving unit having an emitting section and a scanning section to make light flux scan within a monitoring space, a processing section to measure a distance to an object by processing signals from the light projecting and receiving unit and to output a measurement point marker group provided with three-dimensional distance information for each measurement point, a display device, and a user interface to perform input of temporary attitude information, includes: inputting the temporary attitude information via the user interface to adjust an attitude or position of the measurement point marker group displayed on the display device; performing coordinate conversion for at least the measurement point marker group on a basis of the temporary attitude information having been input; and displaying the measurement point marker group after having been subjected to the coordinate conversion on the display device.

10 Claims, 12 Drawing Sheets

(51) Int. Cl.
*G01S 17/06* (2006.01)
*G06T 7/00* (2017.01)

(56) References Cited

FOREIGN PATENT DOCUMENTS

| JP | 2011-002339 | 1/2011 |
|----|-------------|--------|
| JP | 2011-185664 | 9/2011 |
| JP | 2012-093834 | 5/2012 |
| JP | 2014-062795 | 4/2014 |
| JP | 2015-75382  | 4/2015 |

* cited by examiner

SETTING METHOD OF MONITORING SYSTEM AND MONITORING SYSTEM

RELATED APPLICATIONS

This is a U.S. National Phase Application under 35 USC 371 of International Application PCT/JP2017/017468 filed on May 9, 2017.

This application claims the priority of Japanese application no. 2016-098628 filed May 17, 2016, the entire content of which is hereby incorporated by reference.

TECHNICAL FIELD

The present invention relates to a setting method of a monitoring system that, for example, projects laser light etc. so as to scan and monitors an object, and a monitoring system.

BACKGROUND ART

As a monitoring device for detecting an invader into a monitoring space, one using a distance image has been proposed. In here, the distance image is one having distance information as pixel values. In concrete terms, as shown in Patent Literature 1, a monitoring device has been known that transmits laser light toward a monitoring space and measures a distance to an object in a monitoring space on a basis of the time from the transmitting to the receiving of reflected light. In such a monitoring device, the inside of a monitoring space is scanned two-dimensionally by changing the sending direction of a measurement medium, such as laser light, sequentially, it is possible to obtain distance information with regard to a plurality of directions facing the monitoring space, whereby a distance image can be formed.

In the monitoring device using a distance image, a so-called background subtraction method is used in the following ways. That is, a distance image (background image) serving as a background in which a moving object does not exist, has been acquired beforehand, and the acquired background image and an input distance image (current image) are compared so as to extract pixels corresponding to a distance near than the background image, thereby obtaining a change region. With this, on the basis of the size and shape of the change region and the distance information on the current image, it is possible to determine whether a moving object is a detection object made a target.

The distance image has information on the direction of an object in the case of been looked from the transmission and reception section of a laser light flux etc. and the distance to the object. Therefore, it becomes possible to know the size and shape of the object on the basis of the distance image. For example, in the use of invader detection, it becomes possible to distinguish a comparatively big person in the distance and a small animal (a rat, a cat, etc.) in the vicinity, whereby a detection accuracy for an invader can be improved.

CITATION LIST

Patent Literature

PTL 1: JP 2007-122507A
PTL 2: JP 2015-075382A

SUMMARY OF INVENTION

Technical Problem

For example, in the case of installing a monitoring device that uses invisible light such as infrared light, since it is difficult to confirm whether it is installed with an attitude so as to monitor an intended area, it is considered to display a distance image on a display device and to adjust an installing position and attitude while looking at it. In this case, in order for a worker to grasp a monitoring space intuitively, since it is necessary to acquire and display the correct three-dimensional configuration of the monitoring space in addition to the installing attitude of a monitoring device, the acquisition of the installing attitude of the monitoring device becomes an issue. To counter this, considered is a method of attaching externals sensors, such as a gyro sensor and a GPS (Global Positioning System), to the monitoring device. However, it results in an increase in cost. Moreover, in the case where the monitoring device is a stationary type that is installed fixedly, the installing attitude is fixed. Accordingly, since these sensors are used only at the time of the installing work of the monitoring device, it is not cost effective.

On the other hand, Patent Literature 2 discloses a technique that extracts road surface candidate points being distance measurement points detecting a road surface by a mounting attitude presuming section from a plurality of distance measurement points acquired by sweeping irradiation by a laser radar and presumes a mounting attitude from an angle or distance formed by a road flat surface calculated from the plurality of road surface candidate points and a reference surface corresponding to the road surface. However, in such a conventional technique, in order to calculate a road flat surface, fast Fourier transform (FFT) processing is performed for the distance measurement data so as to calculate the road flat surface. Accordingly, there is a problem that the system becomes complicated.

The present invention has been achieved in view of the above-described circumstances, and an object is to provide a setting method of a monitoring system that does not need an external sensor for acquiring an installing attitude and can presume the installing attitude of a monitoring device simply, and a monitoring system.

Solution to Problem

In order to realize at least one of the above-mentioned object, a setting method of a monitoring system, reflecting one aspect of the present invention, the monitoring system including:

a light projecting and receiving unit having an emitting section to emit a light flux, a scanning section to make the light flux scan within a monitoring space, and a light receiving section to receive a light flux reflected from an object within the monitoring space, a processing section to measure a distance to the object by processing signals from the light projecting and receiving unit and to output a measurement point marker group provided with three-dimensional distance information for each measurement point, a display device to display the measurement point marker group output from the processing section on a virtual space, and a user interface to perform input of temporary attitude information in response to an operation of a user, the method comprising:

inputting the temporary attitude information through the user interface so as to adjust an attitude or position of the measurement point marker group displayed on the display device;

performing coordinate conversion for at least the measurement point marker group on the basis of the temporary attitude information having been input; and displaying the measurement point marker group after having been subjected to the coordinate conversion on the display device.

In order to realize at least one of the above-mentioned object, a monitoring system reflecting one aspect of the present invention including:

a light projecting and receiving unit having an emitting section to emit a light flux, a scanning section to make the light flux scan within a monitoring space, and a light receiving section to receive a light flux reflected from an object within the monitoring space;

a user interface to perform input of temporary attitude information;

a processing section to measure a distance to the object by processing signals from the light projecting and receiving unit and to output a measurement point marker group provided with three-dimensional distance information for each measurement point; and a display device to display the measurement point marker group output from the processing section, wherein the processing section converts coordinate of the measurement point marker group on the basis of the temporary attitude information input by the user interface and outputs, thereby adjusting an attitude or position of the measurement point marker group displayed on the display device.

Advantageous Effects of Invention

According to the present invention, it is possible to provide a setting method of a monitoring system that does not need an external sensor for acquiring an installing attitude and can presume the installing attitude of a monitoring device simply, and a monitoring system.

DESCRIPTION OF EMBODIMENTS

Figure 1:
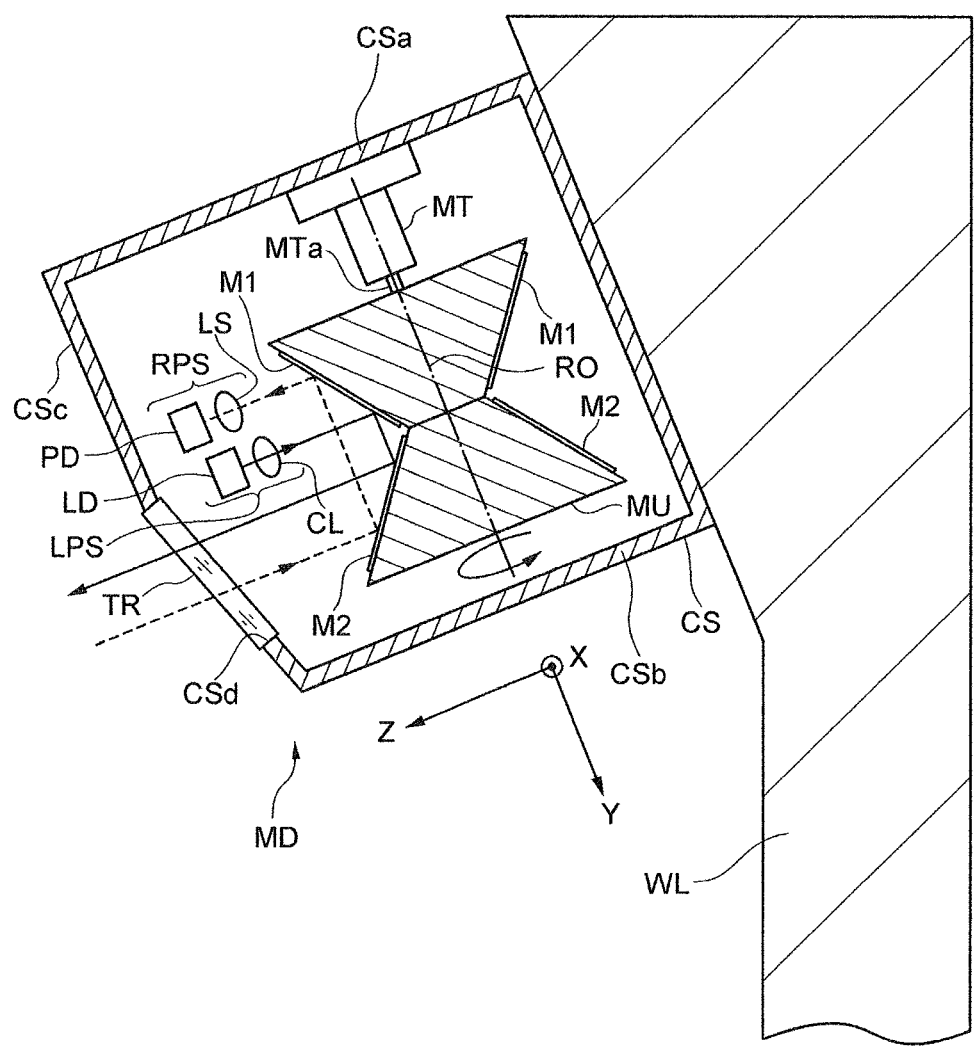
FIG. 1 is a cross sectional view of a monitoring device MD according to the present embodiment.

Hereinafter, an embodiment of the present invention is described with reference to the attached drawings. FIG. 1 is a cross sectional view of a monitoring device MD according to the present embodiment. Although the monitoring device MD is shown in a state of being attached on an inclined wall surface, the shape, length, and the like of each of constitutional elements may be different from the actual shape, length, and the like. Moreover, it is assumed that, in FIG. 1, the monitoring device MD is installed in a state where top and bottom are made reversed.

The monitoring device MD includes, for example, a pulse type semiconductor laser LD that emits a laser light flux, a collimating lens CL that converts diverging light from the semiconductor laser LD into parallel light, a mirror unit MU that projects the laser light made parallel in the collimating lens CL by a rotating mirror surface toward a monitoring space so as to scan and reflects the reflected light from an object, a lens LS that collects the reflected light coming from the object and reflected by the mirror unit MU, a photodiode PD that receives the light collected by the lens LS, a processing circuit (processing section) PROC that obtains distance information correspondingly to a time difference between an emitting timing of the semiconductor laser LD and a light receiving timing of the photodiode PD, a motor MT that drives rotationally the mirror unit MU, and a casing CS that accommodates these components. The photodiode PD includes a plurality of pixels being aligned in the Y direction.

In the present embodiment, the semiconductor laser LD and the collimating lens CL constitute an emitting section LPS, the lens LS and the photodiode PD constitute a light receiving section RPS, the mirror unit MU constitutes a scanning section, and further, these constitute a light projecting and receiving section. It is preferable that the optical axis of each of the emitting section LPS and the light receiving section RPS is orthogonal relative to the rotation axis RO of the mirror unit MU.

The casing CS that is fixed to a wall WL etc. being a rigid body and is shaped in a box, includes an upper wall CSa, a lower wall CSb opposite to this, and side walls CSc that connect the upper wall CSa and the lower wall CSb. On a part of the side wall CSc, an opening CSd is formed, and on the opening CSd, a transparent plate TR is attached.

The mirror unit MU has a configuration in which two quadrangular pyramids are joined in opposite directions to each other and are made one body, that is, includes four pairs of paired mirror surfaces M1 and M2 inclining in respective directions so as to face each other (provided that, not limited to the four pairs). It is preferable that the mirror surfaces M1 and M2 are formed by vapor-depositing a reflective film on the surface of a resin material (for example, PC) shaped in the form of the mirror unit.

The mirror unit MU is connected with a shaft MTa of the motor MT fixed to the casing CS, and is driven rotationally. In the present embodiment, the axis line (axis line of rotation) of the shaft MTa extends in the Y direction inclining relative to the vertical direction, and a ZX flat surface formed in the Z direction and the X direction each orthogonal to the Y direction is made to incline relative to the horizontal surface. However, the axis line of the shaft MTa may be made to coincide with the vertical direction.

Figure 12:
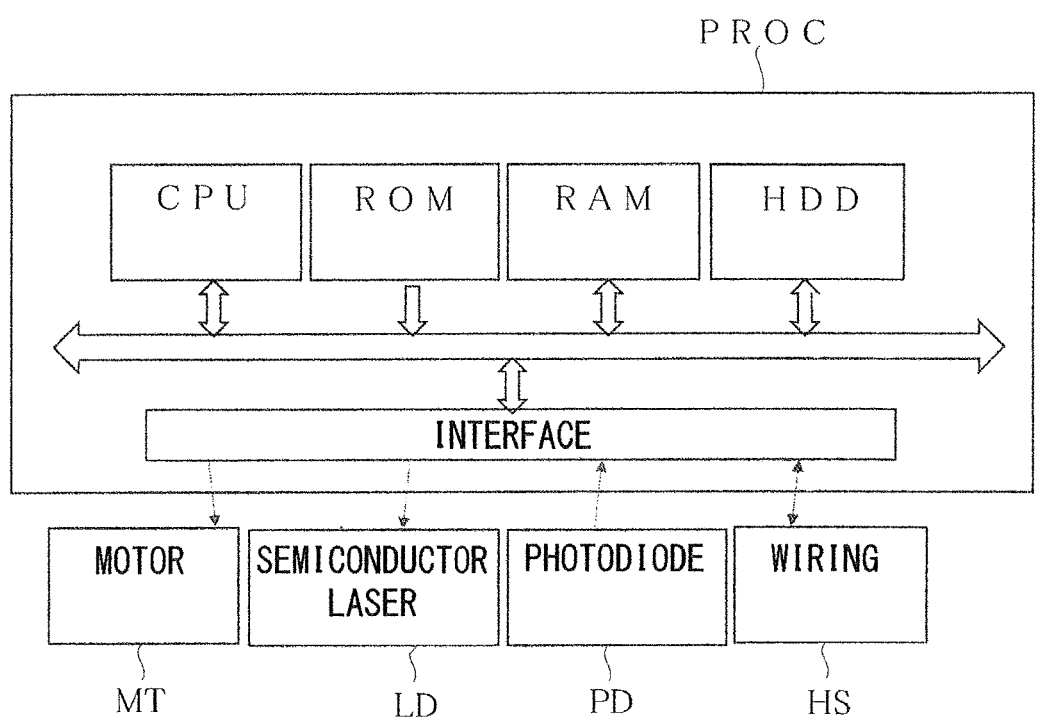
FIG. 12 is a block diagram showing one example of a processing circuit (processing section) PROC of a monitoring device MD shown in FIG. 1.

As shown in FIG. 12, the processing circuit PROC includes a central arithmetic processing section CPU, a read only memory ROM, a random access memory RAM, and a hard disk HDD being a nonvolatile memory, and is connected with the motor MT, the semiconductor laser LD, the photodiode PD, the wiring HS, etc. via the interface. Moreover, the central arithmetic processing section CPU processes programs and data stored in the read only memory ROM or the hard disk HDD by using the random access memory RAM, thereby performing predetermined control and information processing.

Next, an object detection principle of the monitoring device MD is described. In FIG. 1, diverging light intermittently emitted in a pulse form from the semiconductor laser LD is converted into a parallel light flux by the collimating lens CL, enters a first mirror surface M1 of the rotating mirror unit MU, is reflected on there, further reflected by the second mirror surface M2, thereafter, passes through the transparent plate TR, and is projected toward an external monitoring space to scan as laser spot light having, for example, a longitudinally-long rectangular cross section. In this connection, a direction in which laser spot light having been emitted returns as reflected light after having been reflected by an object, is referred to as a light projecting and receiving direction. A laser spot light flux advancing in the same light projecting and receiving direction is detected by the same pixel.

Figure 2:
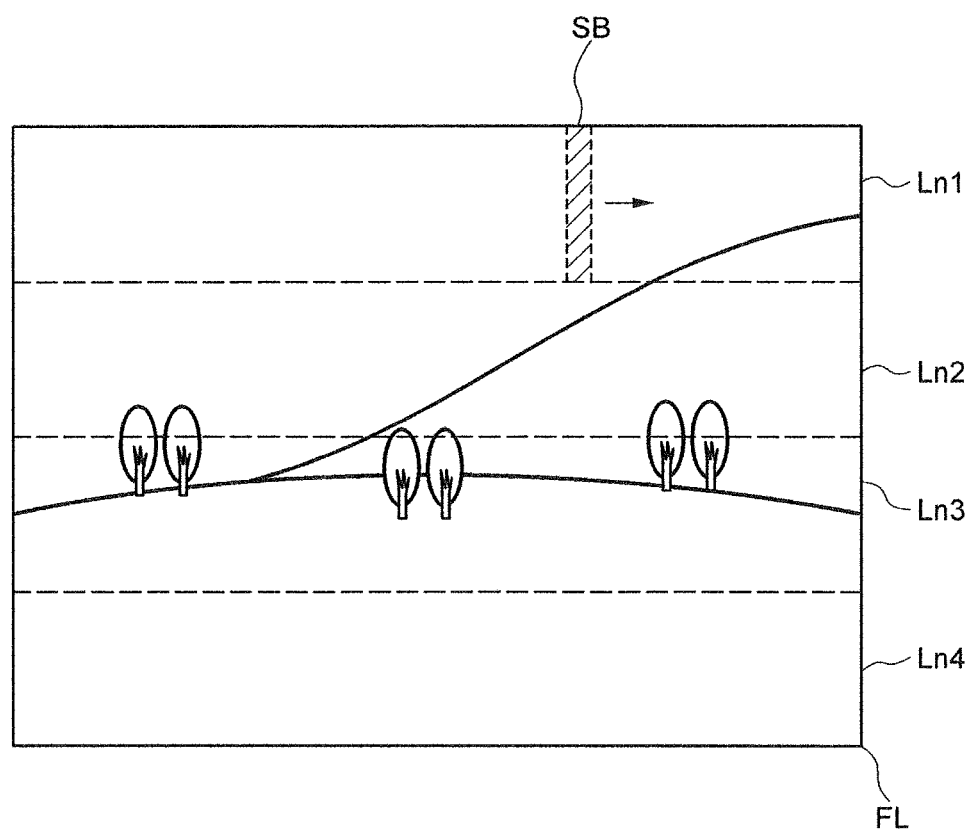
FIG. 2 is an illustration showing a state where emitted laser spot light SB (indicated with hatching) scans within a monitoring space of a monitoring device MD correspondingly to the rotation of a mirror unit MU.

FIG. 2 shows an illustration showing a state where emitted laser spot light SB (indicated with hatching) scans within a monitoring space of the monitoring device MD correspondingly to the rotation of the mirror unit MU. Here, in each of combinations of the first mirror surface M1 and the second mirror surface M2 in the mirror unit MU, an intersecting angle between them is made different. A laser light flux is reflected by the rotating first mirror surface M1 and second mirror surface M2 sequentially. First, laser light reflected by the first mirror surface M1 and the second mirror surface M2 of the first pair scans in the horizontal direction from the left to the right on a region Ln1 at the top of the monitoring space correspondingly to the rotation of the mirror unit MU. Next, laser light reflected by the first mirror surface M1 and the second mirror surface M2 of the second pair scans in the horizontal direction from the left to the right on a second region Ln2 from the top of the monitoring space correspondingly to the rotation of the mirror unit MU. Next, laser light reflected by the first mirror surface M1 and the second mirror surface M2 of the third pair scans in the horizontal direction from the left to the right on a third region Ln3 from the top of the monitoring space correspondingly to the rotation of the mirror unit MU. Next, laser light reflected by the first mirror surface M1 and the second mirror surface M2 of the fourth pair scans in the horizontal direction from the left to the right on a region Ln4 at the bottom of the monitoring space correspondingly to the rotation of the mirror unit MU. With this, the scan of one time for the whole monitoring space capable of being monitored by the monitoring device MD, has been completed. In this way, in the case where a laser spot light flux is made to scan two-dimensionally without a gap (provided that, in the case where the respective loci of scanned laser spot light fluxes adjoin to each other (for example, the region Ln1 and the region Ln2), although it means that the adjoining loci come in contact with each other without a gap, it includes a case where the adjoining loci overlap partially with each other), at the time of setting the monitoring device MD, it becomes possible to obtain a distance image that allows a user to gasp a space intuitively, which is preferable. Images obtained by scanning these regions Ln1 through Ln4 are combined, thereby obtaining one frame FL. Successively, after the mirror unit MU has made one rotation, when the first mirror surface M1 and the second mirror surface M2 of the first pair return, the scanning from the uppermost region Ln1 to the lowermost region Ln4 in the monitoring space is repeated again, thereby obtaining the next frame FL.

In FIG. 1, among a laser light flux having been projected so as to scan, some of the laser light reflected by hitting an object, pass again through the transparent plate TR and enter the second mirror surface M2 of the mirror unit MU in the casing CS, are reflected on there, further, are reflected by the first mirror surface M1, are collected by the lens LS, and are detected by the light receiving surface of the photodiode PD for each pixel. Furthermore, the processing circuit PROC being a processing section obtains distance information correspondingly to a time difference between an emitting timing of the semiconductor laser LD and a light receiving timing of the photodiode PD. With this, by performing the detection of objects on the whole region within the monitoring space, it is possible to obtain a frame FL (refer to FIG. 2) as a distance image (hereinafter, referred to as a measurement point marker group) having distance information (three-dimensional distance information) for each pixel (measurement point). The shape of a measurement point marker constituting the measurement point marker group is the same as the shape of the spot light flux SB actually made to scan. The signals from the processing circuit PROC can be output to a later-mentioned personal computer PC at the time of installation, transmitted to a distant monitor through a non-illustrated network etc. and then, displayed at the time of monitoring, and memorized in the memory device.

Figure 3:
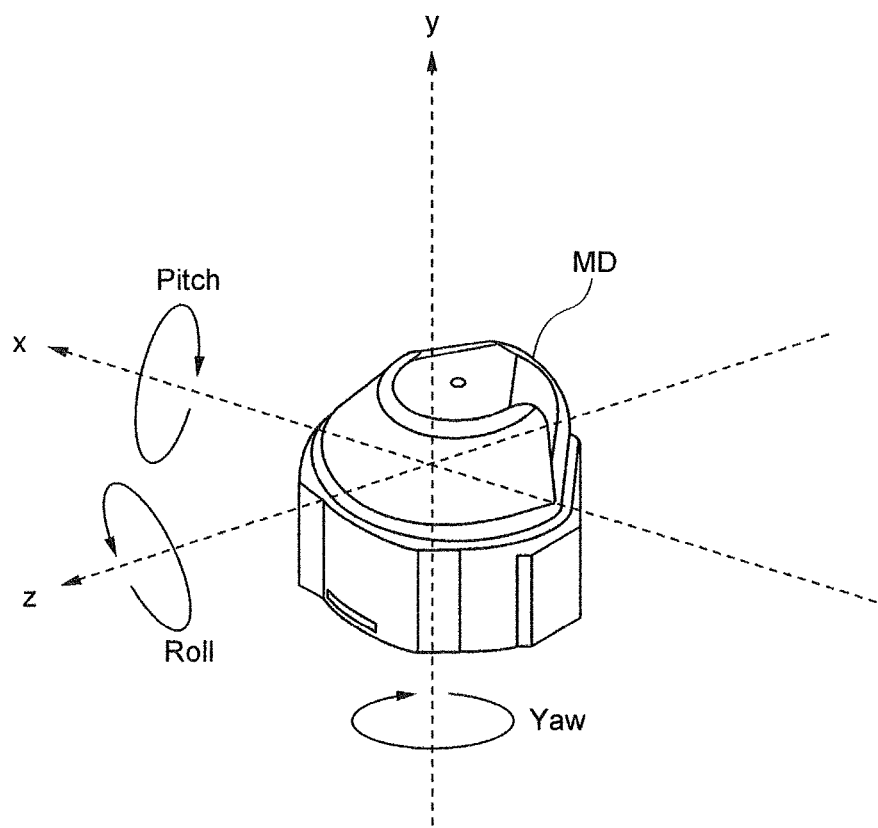
FIG. 3 is a perspective view of a monitoring device MD.

Next, a setting method of the monitoring device MD is described. FIG. 3 is a perspective view of the monitoring device MD. In FIG. 3, a rotation axis line direction is made a Y direction, a direction orthogonal to the Y direction and facing the front of the monitoring device MD is made a Z direction, and a direction orthogonal to each of the Y direction and the Z direction is made an X direction. Moreover, it is assumed that a relative rotation around the Y direction is denoted as YAW (a yawing angle), a relative rotation around the Z direction is denoted as ROLL (a rolling angle), and a relative rotation around the X direction is denoted as PITCH (a pitching angle).

Figure 4:
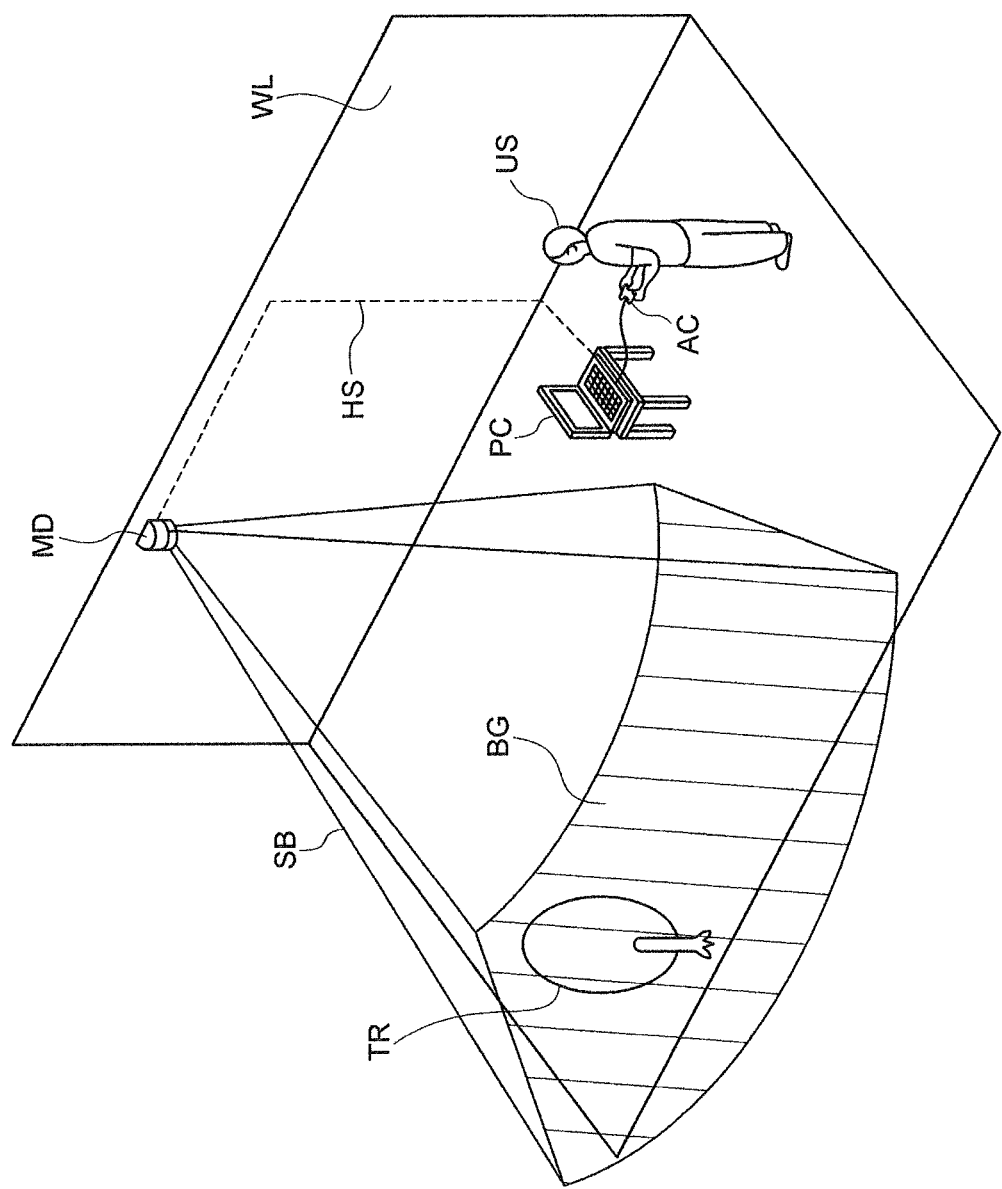
FIG. 4 is an illustration showing an installation situation of a monitoring device MD.
Figure 5:
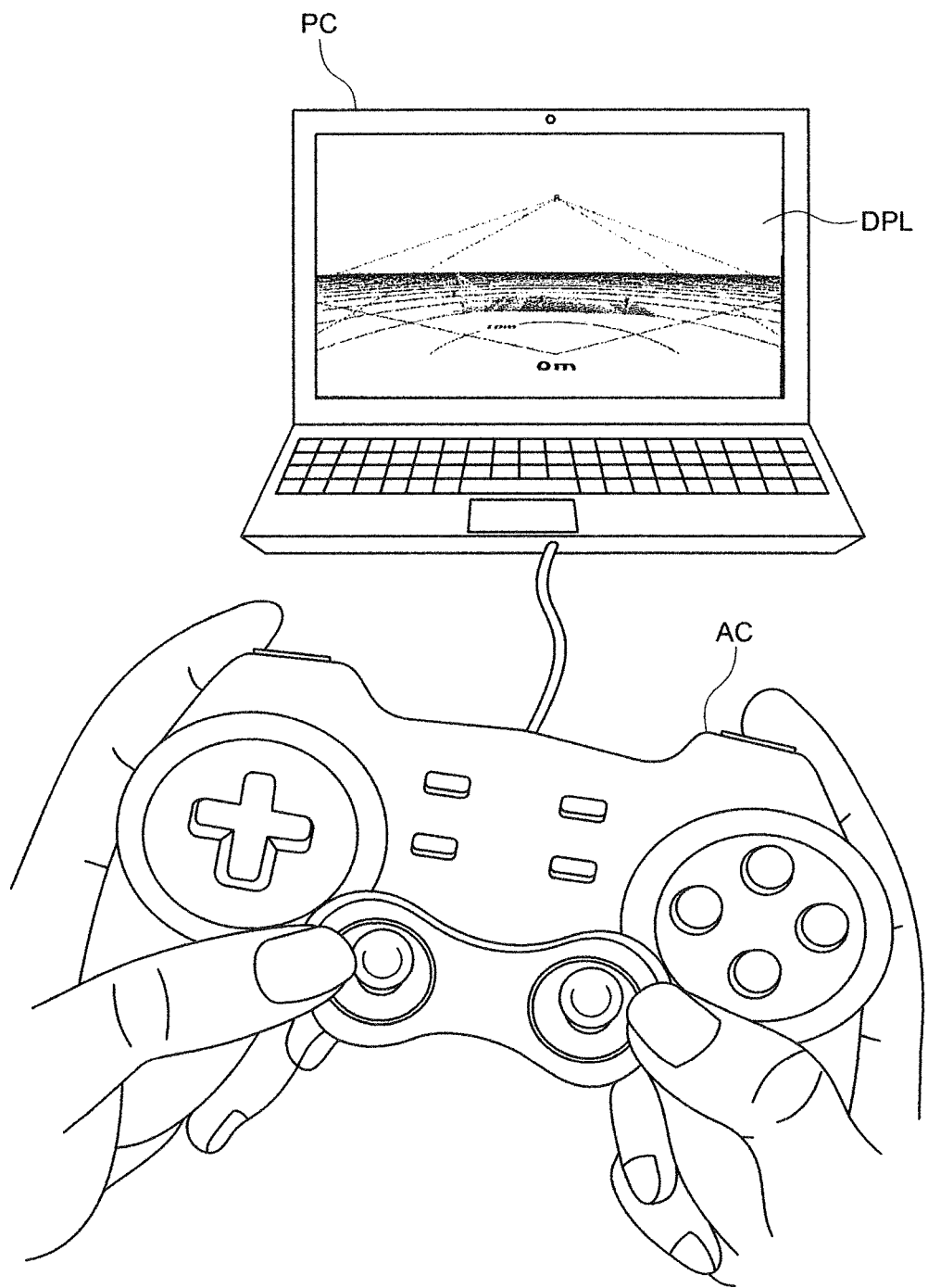
FIG. 5 is an illustration showing a personal computer that displays a measurement point marker group.

FIG. 4 is an illustration showing an installation state of the monitoring device MD, and FIG. 5 is an illustration showing a personal computer that displays a measurement point marker group. As shown in FIG. 4, the processing circuit PROC of the monitoring device MD is connected to the personal computer PC with wiring HS. Moreover, as shown in FIG. 5, to the personal computer PC, a controller (user interface) AC equipped with an analog input section, such as a joystick capable of being operated by a user US, is connected. In this connection, the monitoring device MD, the personal computer PC, and the controller AC constitute a monitoring system.

In FIG. 4, the monitoring device MD is installed on the wall WL in a state where it looks down from an upper portion obliquely at a predetermined angle. Therefore, the monitoring range of the monitoring device MD is a range shaped in the form of a sector as shown with hatching in FIG. 4. This is made a background BG. Provided that, in the case where a laser light flux is infrared light, a user US cannot visually check a background BG being an irradiation range of a light flux, but can estimate which area is being irradiated, from the orientation of the monitoring device MD. While visually comparing the display DPL of the personal computer PC with a ground surface being an almost horizontal surface including a background BG, the user US applies a virtual space including a displayed measurement point marker group to the actual background by operating the controller AC.

Since the monitoring device MD does not have a position sensor etc., in the state of being installed on the side surface of the wall WL, it is not possible to detect a self-attitude. Then, by using the measurement point marker group output from the monitoring device MD, it is assumed that the virtual space is applied to an actual background. In the case of describing more concretely, the monitoring device MD detects the actual background BG (here, the ground surface) in an initial state. The signals processed by the processing circuit PROC are transmitted to the personal computer PC via the wiring HS, and are displayed on the display (display device) DPL as a measurement point marker group in a virtual space. For the displayed virtual space, the user US can perform rotation, parallel movement, viewpoint movement, etc. arbitrarily via the operation button and lever of the controller AC. In this connection, it is preferable that the measurement point marker group is displayed with different colors correspondingly to a distance to a measurement point such that, for example, a measurement point distant from the monitoring device MD is displayed with blue and a measurement near to the monitoring device MD is displayed with red. Moreover, a measurement point marker group may be provided with different colors correspondingly to the intensity of light reflected from a measurement point. Moreover, although it is preferable that the shape of a measurement marker is the same as the actual shape of a laser spot, it may be, for example, an arbitrary shape such as a square, a circle, an asterisk, or the like.

Figure 6:
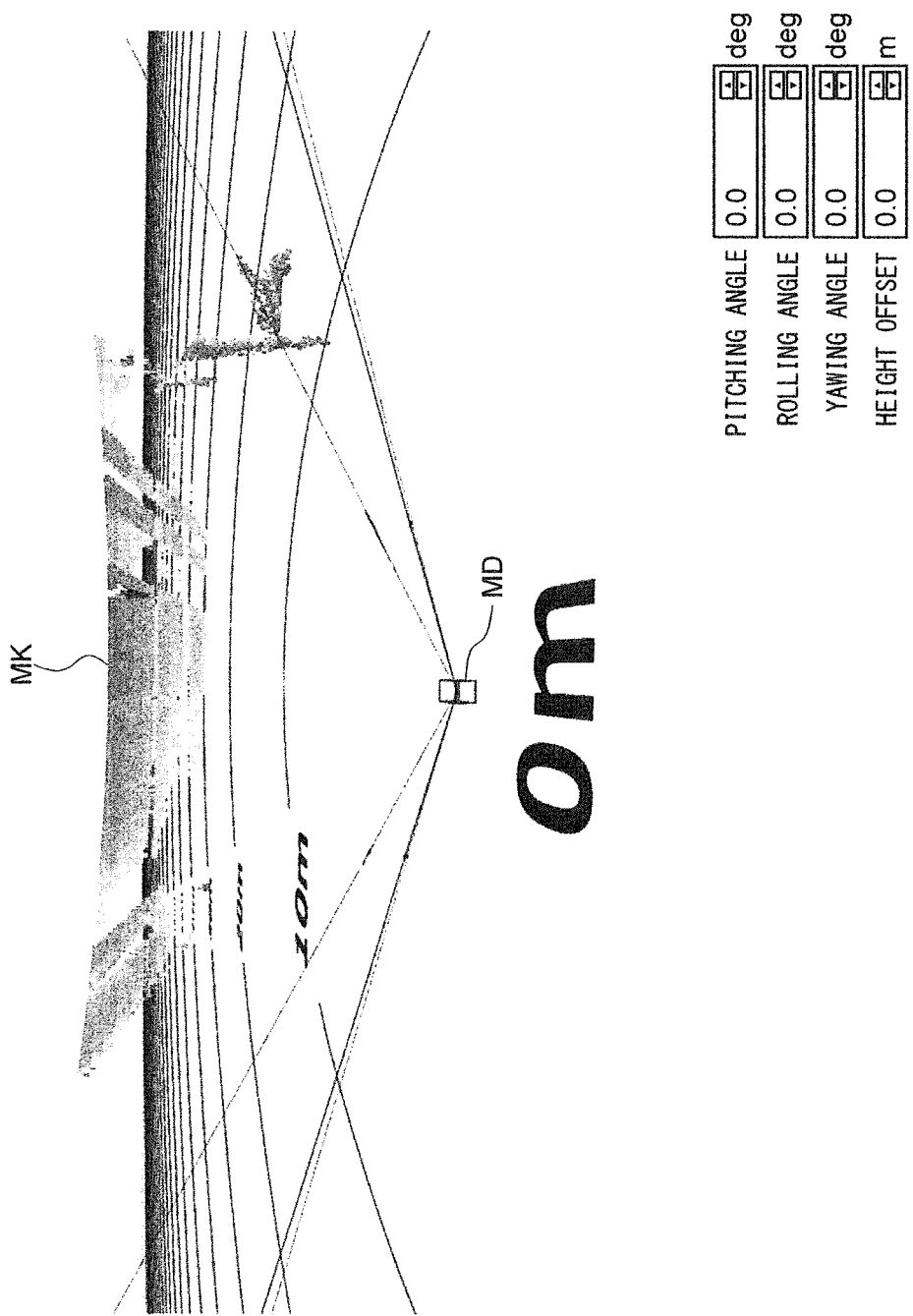
FIG. 6 is an illustration showing an example of a measurement point marker group on a virtual space displayed on a display DPL.

Although FIG. 6 to FIG. 11 each is an illustration showing an example of a measurement point marker group on a virtual space displayed on the display DPL, a numerical value (10 m) in the illustration represents a distance from the monitoring device MD in a reference manner. FIG. 6 shows a state viewed from the monitoring device MD along the Z direction by the input of the controller AC. In this connection, although the values of a yawing angle, a rolling angle, a pitching angle, and a height offset of a virtual space, are indicated on the lower right portion of the display DPL, in FIG. 6, all the values are made zero, because they are an initial state. These values change in accordance with temporary information input described in the below, and support adjustment by the user US.

Figure 7:
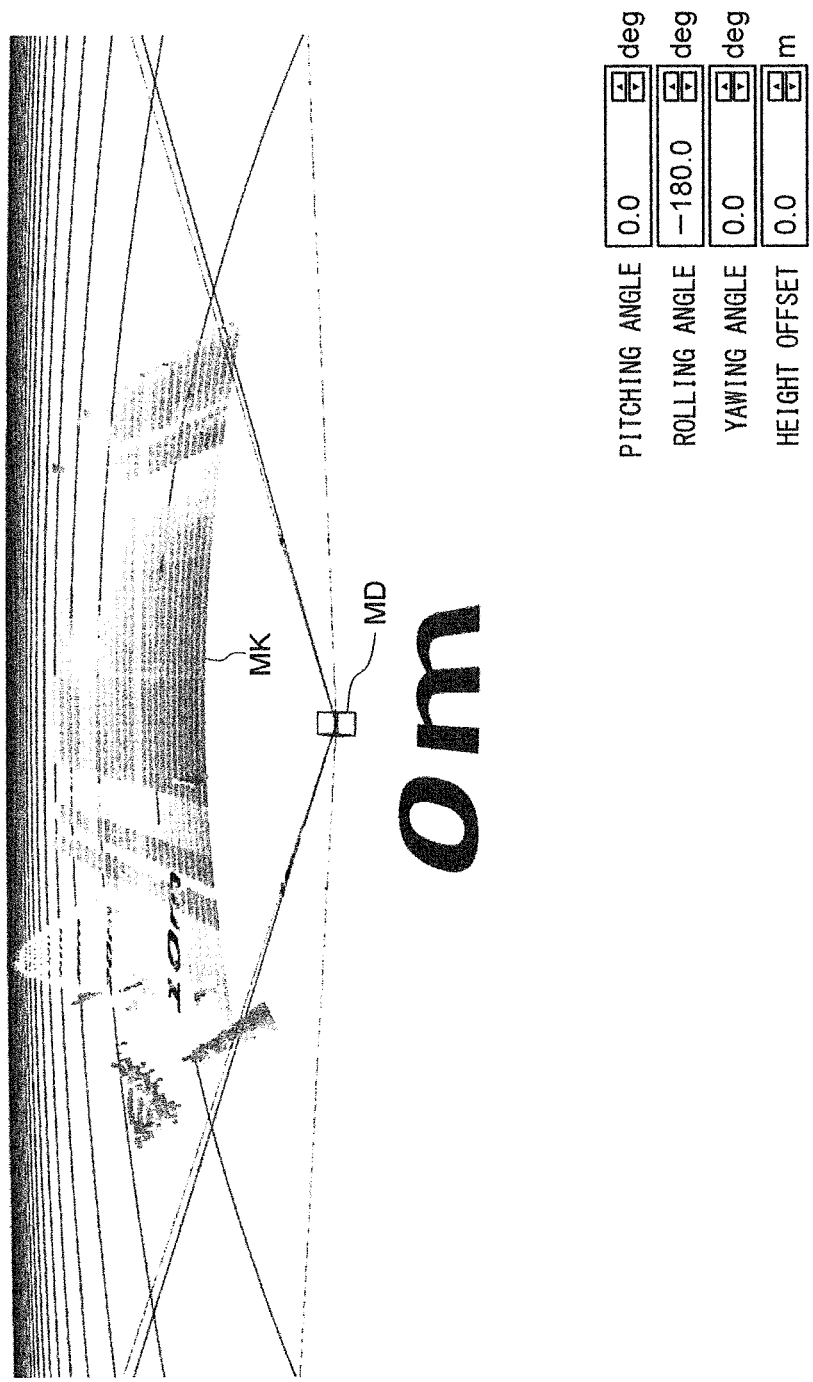
FIG. 7 is an illustration showing an example of a measurement point marker group on a virtual space displayed on a display DPL.

Here, in the case where there exists an object extending in the vertical direction such as a tree TRE (FIG. 4) within the background BG, the user US can presume from its orientation that the top and bottom in the Y direction are reversed. Alternatively, the matter that the monitoring device MD is installed upside down, is clear by checking its installed condition. Accordingly, from the above matter, it is possible to presume that the top and bottom in the Y direction are reversed. Furthermore, by using the matter that the background BG is almost a horizontal plane, it may be presumed that the top and bottom in the Y direction are reversed. In such a case, if the user US operates the controller AC and instructs so as to change the rolling angle of the virtual space together with the measurement point marker group (relative to the attitude of an object (background BG) actually existing in the monitoring space, inputs a temporary installation attitude so as to make the attitude of the measurement point marker group MK corresponding to it in the virtual space, follow), the personal computer PC performs coordinate conversion, and displays the measurement point marker group MK in a state where the top and bottom in the Y direction have become reversed as shown in FIG. 7. That is, "temporary installation information" used in here means to make the top and bottom of the virtual space including a measurement point marker group reversed (rotate). While looking at the displayed measurement point marker group MK, the user US adjusts the controller AC finely, and adjusts the attitude of the measurement point marker group MK. Here, after the adjustment, the rolling angle of the virtual space has become −180 degrees relative to the initial state.

Figure 8:
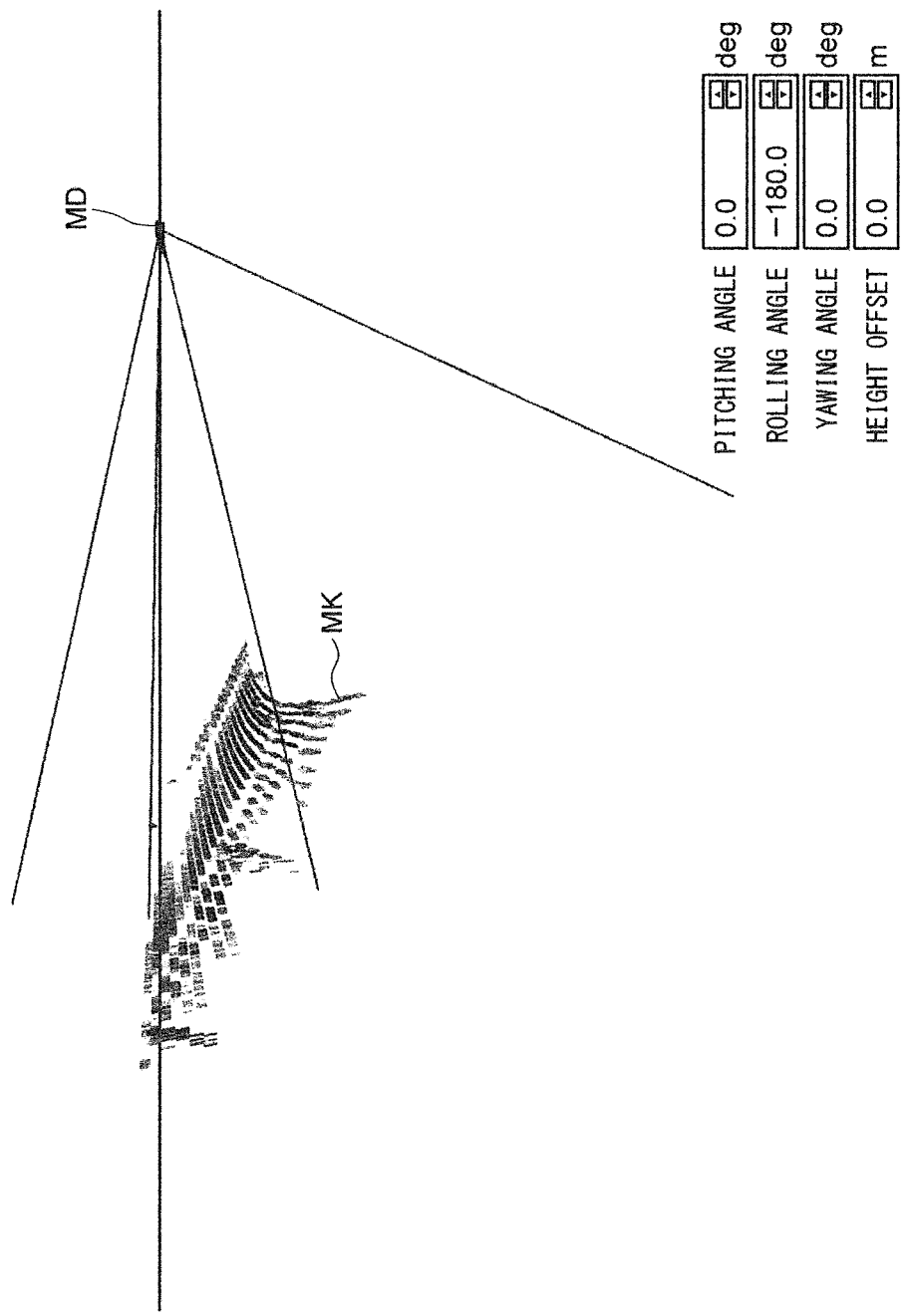
FIG. 8 is an illustration showing an example of a measurement point marker group on a virtual space displayed on a display DPL.
Figure 9:
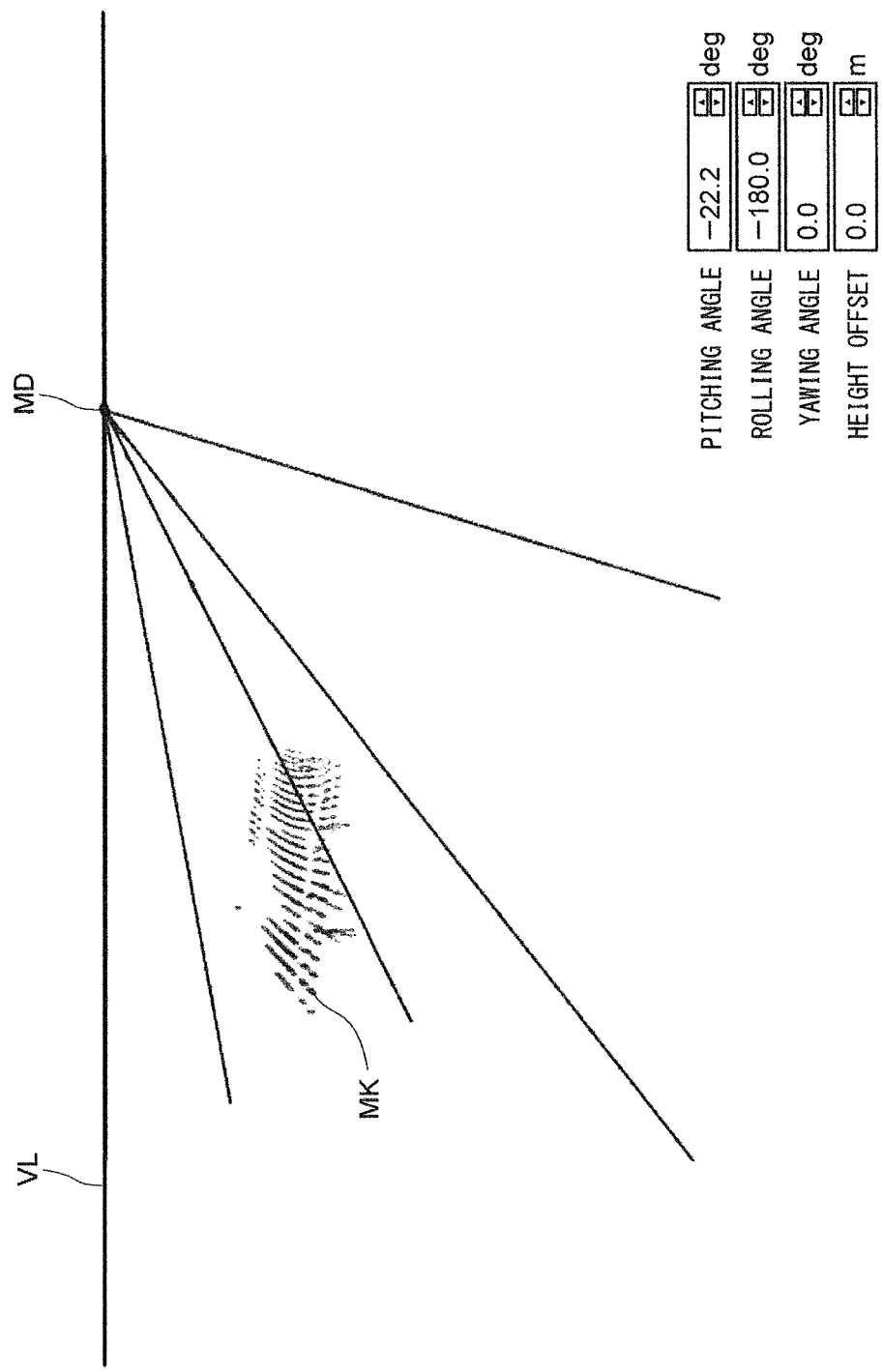
FIG. 9 is an illustration showing an example of a measurement point marker group on a virtual space displayed on a display DPL.

Next, in the case where the user US instructs viewpoint movement to a state of having been viewed from the viewpoint of the X direction by the controller AC, the display DPL displays the measurement point marker group MK shown in FIG. 8. Since the user US who has visually compared the indication shown in FIG. 8 with the background BG, recognizes that the background BG is an almost horizontal plane, it can be presumed clearly that the virtual space inclines. Then, if the user US operates the controller AC and instructs to change the pitching angle of the virtual space together with the measurement point marker group (relative to the attitude of an object (background BG) actually existing in the monitoring space, inputs temporary attitude information so as to make the attitude of the measurement point marker group MK corresponding to it in the virtual space, follow). Successively, the personal computer PC performs coordinate conversion, and displays the measurement point marker group MK in a state where the inclination is returned so as to make the measurement point marker group MK horizontal as shown in FIG. 9. That is, "temporary attitude information" used in here means to change (rotate) the pitching angle of the virtual space including a measurement point marker group. The temporary attitude information input from the controller AC is once memorized in the nonvolatile memory HDD, and on the Basis of the temporary attitude information memorized in the nonvolatile memory HDD, the processing circuit PROC of the personal computer PC converts the coordinates of the measurement point marker group. With this constitution, while looking at the displayed measurement point marker group MK, the user US adjusts the controller AC finely, and adjusts the attitude of the measurement point marker group MK. Here, after the adjustment, the pitching angle of the virtual space has become −22.2 degrees relative to the initial state.

Figure 10:
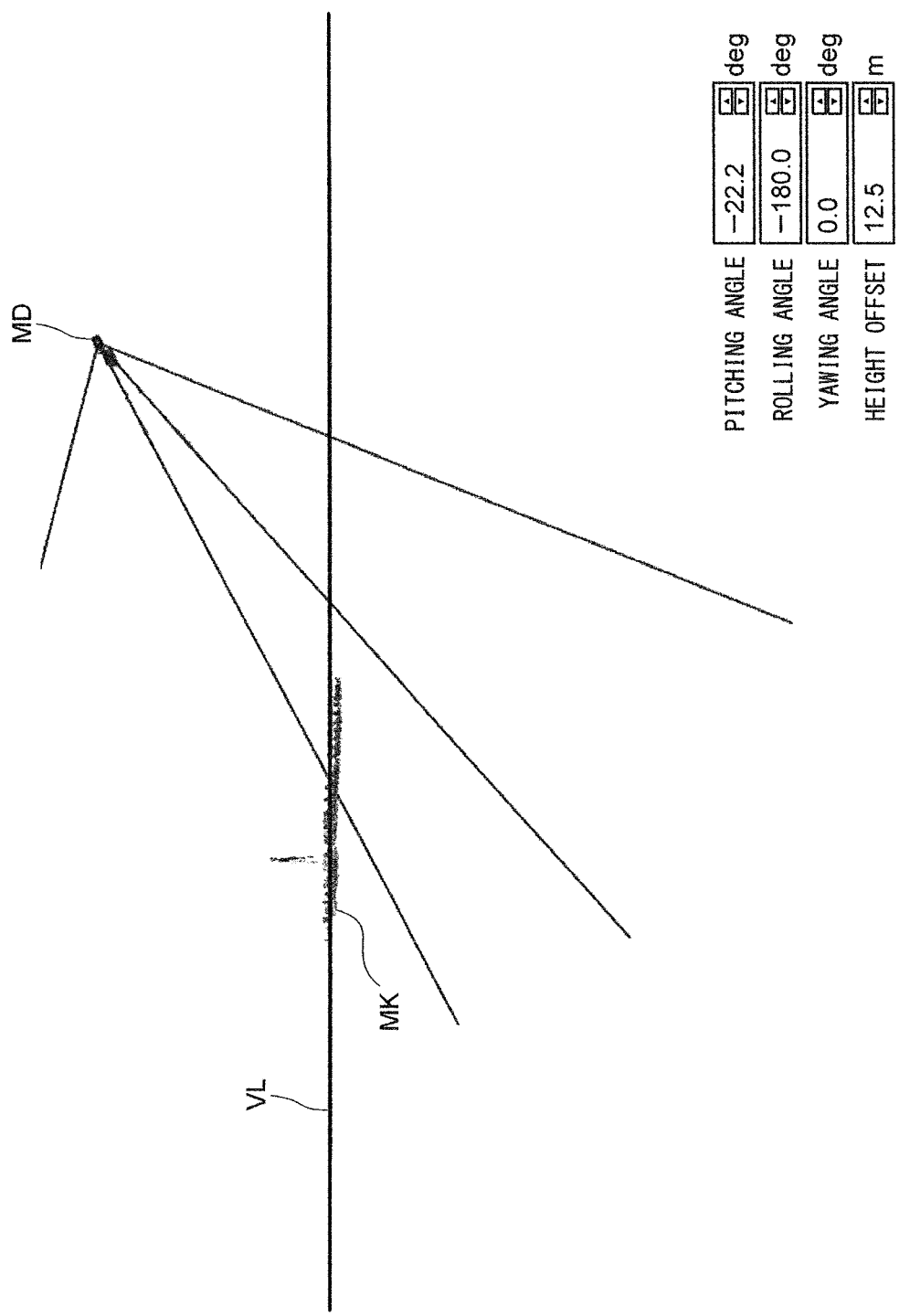
FIG. 10 is an illustration showing an example of a measurement point marker group on a virtual space displayed on a display DPL.

Moreover, since the user US who has visually compared the indication shown in FIG. 9 with the background BG recognizes that the background BG is the ground surface, it can be determined that it is too low relative to the horizontal plane (reference plane) based on the monitoring device MD itself in the virtual space. Then, if the user US operates the controller AC and instructs to change the height offset of the virtual space together with the measurement point marker group (relative to the position of an object (background BG) actually existing in the monitoring space, inputs temporary attitude information so as to make a relative position relative to the reference surface VL of the measurement point marker group MK corresponding to it in the virtual space, become close), the personal computer PC performs coordinate conversion, and displays the measurement point marker group MK in a state where the measurement point marker group MK has been moved in parallel relatively as shown in FIG. 10. That is, "temporary attitude information" used in here means to shift the measurement point marker group in the virtual space. The temporary attitude information input from the controller AC is once memorized in the nonvolatile memory HDD, and thereafter, is used to convert the coordinates of the measurement point marker group by the processing circuit PROC. While looking at the displayed measurement point marker group MK, the user US adjusts the controller AC finely, and adjusts the position of the measurement point marker group MK. Here, after the adjustment, the height offset of the virtual space has become +12.5 m relative to the initial state.

Figure 11:
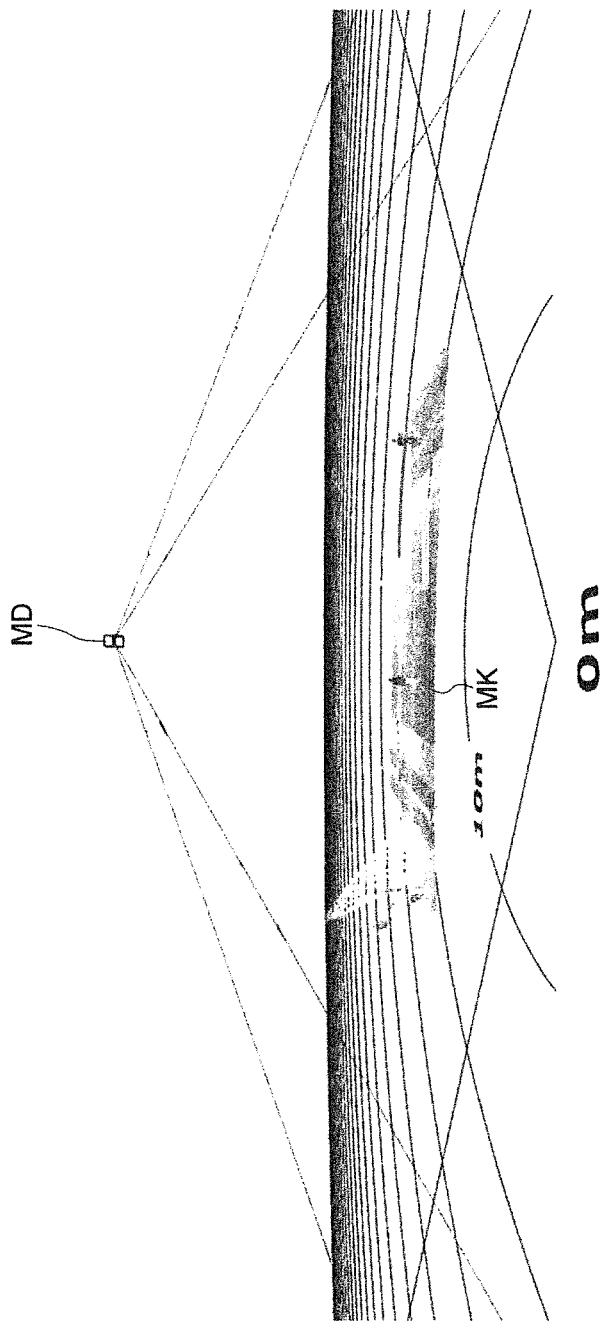
FIG. 11 is an illustration showing an example of a measurement point marker group on a virtual space displayed on a display DPL.

Moreover, if the user US operates the controller AC and instructs viewpoint movement (change of the position of a viewpoint) so as to see the monitoring device MD from the background side along the Z direction, since the display DPL displays the measurement point marker group as shown in FIG. 11 on the basis of the changed view position, the user US can confirm the position of the measurement point marker group MK after the adjustment. In this way, the three-dimensional data of the virtual space having been subjected to the coordinate conversion are memorized in the nonvolatile memory HDD built in the processing circuit PROC shown in FIG. 12, and are used when a monitoring image is displayed on a monitor (not-illustrated) at the time of actual monitoring.

In the conventional technology, in the case of installing a monitoring device that uses infrared light, since it is difficult to check whether it has been installed with an attitude capable of monitoring an intended area, the installing position and the attitude are adjusted while displaying a distance image on a display device and looking at it. In this case, in order for a worker to grasp a monitoring space intuitively, it is necessary to acquire and display the correct three-dimensional configuration of the monitoring space in addition to the installed attitude of the monitoring device. However, in a method of attaching externals sensors, such as a gyro sensor and a GPS (Global Positioning System), to the monitoring device, it leads to an increase in cost. Moreover, in the case where the monitoring device is a stationary type that is installed fixedly, the installing attitude is fixed. Accordingly, since these sensors are used only at the time of the installing work of the monitoring device, it is not cost effective. In contrast to this, according to the present embodiment, a user US can presume the installing attitude of the monitoring device MD simply without an externals sensor, and can grasp the correct configuration of a monitoring space intuitively by looking at the displayed measurement point marker group MK. As a result, it becomes possible to adjust the installation position and attitude of the monitoring device MD and to set appropriately a region where an alarm is issued when an intruder has invaded.

The present invention should not be limited to the embodiments described in the specification, and it is clear for a person skilled in the art from the embodiment and the technical concept written in the present specification that the present invention includes the other embodiment and modified examples. The description and embodiment in the specification are prepared merely for the purpose of exemplification, and the scope of the present invention is shown by the claims mentioned later. For example, in the above embodiment, relative to the attitude and position of a ground surface as a horizontal surface actually existing in the monitoring space, an input of temporary attitude information is performed so as to make the attitude and position of a measurement point marker group follow. However, for example, an input of temporary attitude information may be performed so as to make the attitude and position of a measurement point marker group follow relative to the attitude and position of a wall surface, a standing tree, or the like as a vertical surface actually existing in a monitoring space.

REFERENCE SIGNS LIST

AC controller
BG background
CL collimating lens
CS casing
CSa upper wall
CSb lower wall
CSc side wall
CSd opening
FL frame
LD semiconductor laser
LPS emitting section
LS lens
M1, M2 mirror surface
MD monitoring device
MT motor
MTa shaft
MU mirror unit
OBJ invader
PC personal computer
PD photodiode
PROC processing circuit
RO rotating shaft
RPS light receiving section
SB laser spot light
TR transparent plate
WL wall

The invention claimed is:
1. A setting method of a monitoring system including:
a light projecting and receiving unit having an emitting section configured to emit a light flux, a scanning section configured to make the light flux scan within a monitoring space, and a light receiving section configured to receive a light flux reflected from an object within the monitoring space,
a processing section configured to measure a distance to the object by processing signals from the light projecting and receiving unit and to output a distance image with three-dimensional distance information for each measurement point of the distance image,
a display device configured to display the distance image output from the processing section in a virtual space, and
a user interface configured to perform input of attitude information in response to an operation of a user,
the method comprising:
inputting the attitude information through the user interface so as to adjust an attitude or position of the distance image displayed on the display device;
performing coordinate conversion for at least the distance image on the basis of the attitude information having been input;
displaying the distance image after having been subjected to the coordinate conversion on the display device; and memorizing at least one of the attitude information, changed from an initial state by the adjustment, and the distance image of the virtual space after having been subjected to the coordinate conversion, in a nonvolatile memory, wherein the attitude information includes a pitching angle, a rolling angle, a yawing angle and a height offset to make an attitude or position of the distance image displayed on the display device follow relative to an object actually existing in the monitoring space.

2. The setting method of a monitoring system according to claim 1, wherein the object is a vertical surface or a horizontal surface in the monitoring space.

3. The setting method of a monitoring system according to claim 1, wherein the distance image is displayed with a different color correspondingly to a distance or reflected light intensity of the measurement point.

4. The setting method of a monitoring system according to claim 1, wherein the attitude information includes information with regard to shift of the distance image.

5. The setting method of a monitoring system according to claim 1, wherein, when an instruction to change a viewpoint position through the user interface has been performed, the display device displays the distance image at a viewpoint position after the changing.

6. A monitoring system, comprising:
a light projecting and receiving unit having an emitting section configured to emit a light flux, a scanning section configured to make the light flux scan within a monitoring space, and a light receiving section configured to receive a light flux reflected from an object within the monitoring space;
a user interface configured to perform input of attitude information;
a processing section configured to measure a distance to the object by processing signals from the light projecting and receiving unit and to output a distance image with three-dimensional distance information for each measurement point of the distance image; and
a display device configured to display the distance image output from the processing section in a virtual space, wherein the processing section is further configured to perform coordinate conversion of the distance image on the basis of the attitude information input by the user interface and output, thereby adjusting an attitude or position of the distance image displayed on the display device and memorizing at least one of the attitude information, changed from an initial state by the adjustment, and the distance image of the virtual space after having been subjected to the coordinate conversion, in a nonvolatile memory, wherein the attitude information includes a pitching angle, a rolling angle, a yawing angle and a height offset to make an attitude or position of the distance image displayed on the display device follow relative to an object actually existing in the monitoring space.

7. The monitoring system according to claim 6, wherein the processing section includes a memory medium that memorizes the attitude information input by the user interface, and performs the coordinate conversion of the distance image on a basis of the attitude information memorized in the memory medium.

8. The monitoring system according to claim 6, wherein the distance image is displayed with a different color correspondingly to a distance or reflected light intensity of the measurement point.

9. The monitoring system according to claim 6, wherein the attitude information includes information with regard to shift of the distance image.

10. The monitoring system according to claim 6, wherein, when an instruction to change a viewpoint position to a changed viewpoint position via the user interface has been performed, the display device displays the distance image at the changed viewpoint position.

* * * * *